(12) United States Patent
Li et al.

(10) Patent No.: US 11,748,613 B2
(45) Date of Patent: Sep. 5, 2023

(54) SYSTEMS AND METHODS FOR LARGE SCALE SEMANTIC INDEXING WITH DEEP LEVEL-WISE EXTREME MULTI-LABEL LEARNING

(71) Applicant: Baidu USA, LLC, Sunnyvale, CA (US)

(72) Inventors: Dingcheng Li, Sammamish, WA (US); Jingyuan Zhang, San Jose, CA (US); Ping Li, Bellevue, WA (US)

(73) Assignee: Baidu USA LLC, Sunnyvale, CA (US)

( * ) Notice: Subject to any disclaimer, the term of this patent is extended or adjusted under 35 U.S.C. 154(b) by 1045 days.

(21) Appl. No.: 16/409,148

(22) Filed: May 10, 2019

(65) Prior Publication Data

US 2020/0356851 A1 Nov. 12, 2020

(51) Int. Cl.
*G06F 16/93* (2019.01)
*G06F 16/35* (2019.01)
*G06F 40/205* (2020.01)
*G06F 40/30* (2020.01)
*G06N 3/08* (2023.01)
*G06N 3/04* (2023.01)
(Continued)

(52) U.S. Cl.
CPC ............ *G06N 3/08* (2013.01); *G06F 16/353* (2019.01); *G06F 16/93* (2019.01); *G06F 40/205* (2020.01); *G06F 40/30* (2020.01); *G06N 3/04* (2013.01); *G06N 3/044* (2023.01); *G06N 3/045* (2023.01)

(58) Field of Classification Search
CPC .......... G06N 3/08; G06N 3/04; G06N 3/0445; G06N 3/0454; G06N 3/0481; G06N 5/022; G06F 16/353; G06F 16/93; G06F 40/205; G06F 40/30; G06F 16/35; G06F 16/316; G06F 16/3344
See application file for complete search history.

(56) References Cited

U.S. PATENT DOCUMENTS 11,055,527 B2 * 7/2021 Torres ................. G06V 30/414
2017/0372628 A1 * 12/2017 Weiss ....................... G09B 5/02
(Continued)

OTHER PUBLICATIONS

Extreme F-Measure Maximization using Sparse Probability Estimates (Year: 2016).*
(Continued)

*Primary Examiner* — Akwasi M Sarpong
(74) *Attorney, Agent, or Firm* — NORTH WEBER & BAUGH LLP

(57) ABSTRACT

Described herein are embodiments for a deep level-wise extreme multi-label learning and classification (XMLC) framework to facilitate the semantic indexing of literatures. In one or more embodiments, the Deep Level-wise XMLC framework comprises two sequential modules, a deep level-wise multi-label learning module and a hierarchical pointer generation module. In one or more embodiments, the first module decomposes terms of domain ontology into multiple levels and builds a special convolutional neural network for each level with category-dependent dynamic max-pooling and macro F-measure based weights tuning. In one or more embodiments, the second module merges the level-wise outputs into a final summarized semantic indexing. The effectiveness of Deep Level-wise XMLC framework embodiments is demonstrated by comparing it with several state-of-the-art methods of automatic labeling on various datasets.

20 Claims, 9 Drawing Sheets

(51) Int. Cl.
  *G06N 3/044* (2023.01)
  *G06N 3/045* (2023.01)

(56) References Cited

U.S. PATENT DOCUMENTS

| | | | |
|---|---|---|---|
| 2018/0089540 A1* | 3/2018 | Merler | G06V 10/82 |
| 2018/0129944 A1* | 5/2018 | Meunier | G06N 20/00 |
| 2018/0190375 A1* | 7/2018 | Chapela | G16H 50/30 |
| 2019/0311024 A1* | 10/2019 | Munro | G06F 16/35 |
| 2020/0027545 A1* | 1/2020 | Xie | G06V 10/40 |
| 2020/0167419 A1* | 5/2020 | He | G06N 3/045 |
| 2020/0210526 A1* | 7/2020 | Leibovitz | G06F 16/355 |
| 2020/0285943 A1* | 9/2020 | Perera | G06F 18/24323 |
| 2020/0312432 A1* | 10/2020 | Wang | G06F 17/18 |
| 2020/0356851 A1* | 11/2020 | Li | G06N 3/044 |
| 2020/0410054 A1* | 12/2020 | Kumar | G06N 3/08 |
| 2021/0295822 A1* | 9/2021 | Tomkins | G16H 70/60 |

OTHER PUBLICATIONS

Deep Learning for Extreme Multi-label Text Classification, Jingzhou Liu (Aug. 2017) (Year: 2017).*
Jingzhou Liu Deep learning for Extreme Multi-label Text Classification (Year: 2017).*
Kalina Jasinska (Extreme F-Measure Maximization using Sparse Probability Estimates-2016) (Year: 2016).*
Collobert et al.,"Natural language processing (almost) from scratch," arXiv preprint arXiv:1103.0398, 2011. (47pgs).
Huang et al.,"Recommending MeSH terms for annotating biomedical articles," Journal of the American Medical Informatics Association 18, 5, 2011 .(9pgs).
Jasinska et al., "Extreme F-measure maximization using sparse probability estimates," In International Conference on Machine Learning (ICML), 2016. (10pgs).
Y Kim,"Convolutional Neural Networks for Sentence Classification," arXiv preprint arXiv:1408.5882, 2014. (6pgs).
Li et al.,"Representation Learning for Question Classification via Topic Sparse Autoencoder and Entity Embedding," In Int. Conf. on Big Data (IEEE Big Data), 2018. (8pgs).
Li et al.,"TMSA: A Mutual Learning Model for Topic Discovery and Word Embedding," In Proc. of the SIAM conf. on Data Mining (SDM), 2019. (9pgs).
P. Li, "Abc-boost: Adaptive base class boost for multi-class classification," In Proc. of the 26th Annual Intr. Conf. on Machine Learning (ICML), 2009. (30pgs).
P. Li, "Robust LogitBoost and Adaptive Base Class (ABC) LogitBoost," arXiv preprint arXiv:1203.3491, 2012. (10pgs).
Zhang et al.,"Deep Extreme Multi-label Learning," arXiv preprint arXiv:1704.03718, 2018. (8pgs).
Liu et al.,"Deep Learning for Extreme Multi-label Text Classification,"In Proc. of the 40th Intr. ACM SIGIR Conf. on Research & Development in Information Retrieval, 2017.(10p.
Sankaran et al.,"Temporal Attention Model for Neural Machine Translation," arXiv preprint arXiv:1608.02927, 2016. (10pgs).
See et al.,"Get to the Point:Summarization with Pointer-Generator Networks," arXiv preprint arXiv:1704.04368, 2017. (20pgs).
Tu et al.,"Modeling Coverage for Neural Machine Translation," arXiv preprint arXiv:1601.04811, 2016. (11 pgs).
Weston et al.,"Label partitioning for sublinear ranking," In Proc. of the 30th Int. Conf. on Machine Learning (ICML), 2013. (9pgs).
Wu et al.,"Probability estimates for multi-class classification by pairwise coupling," Journal of Machine Learning Research 5, 2004. (8pgs).
Yan et al.,"Biomedical literature classification with a CNNs-based hybrid learning network," PloS ONR 13, 7, e0197933, 2018. (31pgs).
Yen et al.,"PD-Sparse: A primal and dual sparse approach to extreme multiclass and multilabel classification," In Int. Con. on Machine Learning (ICML), 2016. (9pgs).
Liu et al.,"MeSHLabeler: improving the accuracy of large-scale MeSH indexing by integrating diverse evidence," Bioinformatics 31, i339-i347, 2015. (9pgs).
Mao et al.,"MeSH Now: automatic MeSH indexing at PubMed scale via learning to rank," Journal of biomedical semantics, 2017. (9pgs).
Merity et al.,"Pointer Sentinel Mixture Models," arXiv preprint arXiv:1609.07843, 2016. (13pgs).
Mi et al.,"Coverage Embedding Models for Neural Machine Translation," arXiv preprint arXiv:1605.03148, 2016. (6pgs).
Mineiro et al.,"Fast label embeddings via randomized linear Algebra," arXiv preprint arXiv:1412.6547, 2015. (15pgs).
Mu et al.,"Social Stream Classification with Emerging New Labels," In Pacific-Asia Conference on Knowledge Discovery and Data Mining (PAKDD), 2018. (4pgs).
Newman et al.,"Using Topic Models to Interpret MedLine's Medical Subject Headings," In AI 2009: Advances in Artificial Intelligence, 2009. (3pgs).
Peng et al.,"DeepMeSH: deep semantic representation for improving large-scale MeSH indexing," Bioinformatics 32, 12 (2016), i70-i79, 2016. (10pgs).
Prabhu et al.,"Fastxml: A fast, accurate and stable tree-classifier for extreme multi-label learning," 2014 (10pages).
Proc.of the 20th ACM SIGKDD Int. conf. on Knowledge discovery & data mining, 2014.(10pgs).
Agrawal et al.,"Multilabel learning with millions of labels: Recommending advertiser bid phrases for web pages," In Proc. of the 22nd Int. conf. on World Wide Web, 2013.(11pgs.
Balasubramanian et al.,"The Landmark Selection Method for Multiple Output Prediction," arXiv preprint arXiv:1206.6479, 2012. (8pgs).
Baumgartner et al.,"Manual curation is not sufficient for annotation of genomic databases,"Bioinformatics 23 (13): i41-i48, 2007. (10pgs).
Bhatia et al.,"Sparse local embeddings for extreme multi-label classification,"In Advances in neural information processing systems (NIPS), 2015. (9pgs).
Bi et al.,"Efficient multi-label classification with many labels," In Int. Conf. on Machine Learning (ICML), 2013. (9pgs).
Busa-Fekete et al.,"Online F-measure optimization,"In Advances in Neural Information Processing Systems (NIPS), 2015. (9 pgs).
Cerri et al.,"Hierarchical multi-label classification using local neural networks," J. Comput, System Sci. 80, 1 , 2014. (10pgs).
Chen et al.,"Feature-aware label space dimension reduction for multi-label classification," In Advances in Neural Information Processing Systems (NIPS), 2012. (9pgs).
Choromanska et al.,"Logarithmic Time Online Multiclass prediction," arXiv preprint arXiv:1406.1822, 2015. (15pgs).
Cisse et al.,"Robust bloom filters for large multilabel classification tasks,"In Advances in Neural Information Processing Systems (NIPS), 2013. (9pgs).

* cited by examiner

800

(a) level 1

(b) level 2

(c) level 3

(d) level 4

(e) level 5

(f) level 6

900

SYSTEMS AND METHODS FOR LARGE SCALE SEMANTIC INDEXING WITH DEEP LEVEL-WISE EXTREME MULTI-LABEL LEARNING

BACKGROUND

A. Technical Field

The present disclosure relates generally to systems and methods for semantic indexing. More particularly, the present disclosure relates to systems and methods for semantic indexing with deep level-wise extreme multi-label learning.

B. Background

With the explosively growing amount of scientific literature, semantic indexing methods with high efficiency are required to build retrieval systems. Even with effective techniques, the semantic indexing process still involves manual curation of key aspects from scientific literature. In order to summarize the main topics of articles, domain experts are usually invited to manually index articles with keywords that are selected from the domain ontology.

Accordingly, what is needed are systems and methods for large scale semantic indexing to improve automatic labeling efficiency.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments. Items in the figures are not to scale.

DETAILED DESCRIPTION OF EMBODIMENTS

Figure 1:
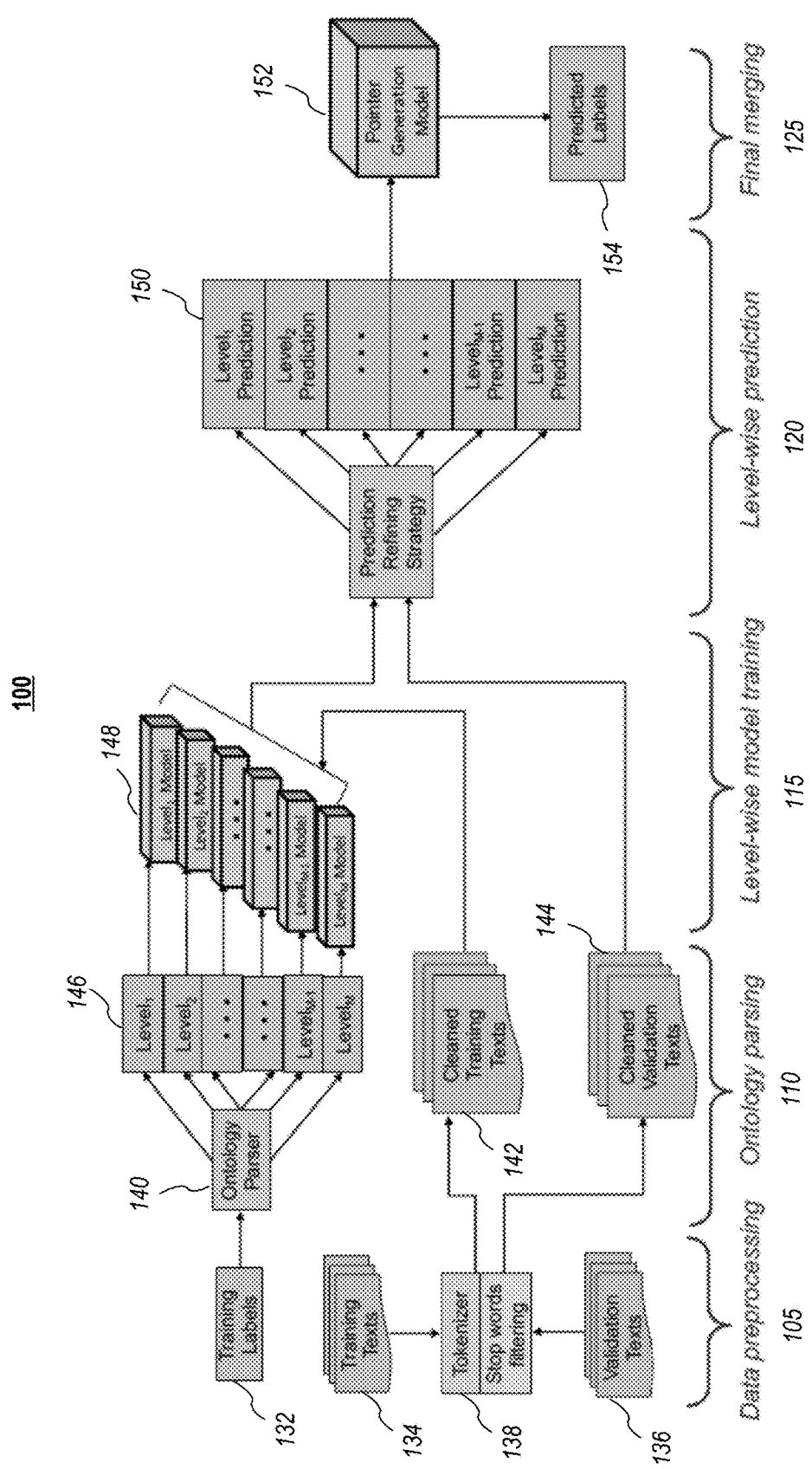
FIG. 1 depicts system architecture of a deep level-wise extreme multi-label learning and classification (Deep Level-wise XMLC) framework, according to embodiments of the present disclosure.

In the following description, for purposes of explanation, specific details are set forth in order to provide an understanding of the present disclosure. It will be apparent, however, to one skilled in the art that embodiments may be practiced without these details. Furthermore, one skilled in the art will recognize that embodiments of the present disclosure, described below, may be implemented in a variety of ways, such as a process, an apparatus, a system, a device, or a method on a tangible computer-readable medium.

Components, or modules, shown in diagrams are illustrative of exemplary embodiments of the invention and are meant to avoid obscuring the present disclosure. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated. An image may be a still image or from a video.

The terms "include," "including," "comprise," and "comprising" shall be understood to be open terms and any lists the follow are examples and not meant to be limited to the listed items. Any headings used herein are for organizational purposes only and shall not be used to limit the scope of the description or the claims. Each reference mentioned in this patent document is incorporated by reference herein in its entirety.

Furthermore, one skilled in the art shall recognize that: (1) certain steps may optionally be performed; (2) steps may not be limited to the specific order set forth herein; (3) certain steps may be performed in different orders; and (4) certain steps may be done concurrently.

A. Introduction

With the explosively growing amount of scientific literature, semantic indexing methods with high efficiency are required to build retrieval systems. Even with effective techniques, the semantic indexing process still involves manual curation of key aspects from scientific literature. In order to summarize the main topics of articles, domain experts are usually invited to manually index articles with keywords that are selected from the domain ontology.

In the medical field, MEDLINE is perhaps the world largest biomedical literature database, and Medical Subject Headings (MeSH) is the domain ontology for indexing articles in MEDLINE. It has greatly improved the experience of medical literature search by mapping queries to MeSH headings. For example, the query teen drug use is mapped to the MeSH headings Adolescent and Substance—Related Disorders. Currently, most of the mapping rules as well as the final indexing of medical literature from MEDLINE are manually generated by domain experts. It is expensive and time-consuming for the human-labeling process of semantic indexing. Automated methods are therefore crucially desired.

The task of automated curation, however, faces significant challenges. First of all, an article is often labeled with multiple keywords or concepts. In addition, the domain ontology involves hundreds of thousands or even millions of labels. Those labels are typically organized in hierarchical structures that are represented in the form of a forest. It is a non-trivial task to simultaneously deal with massive labels, data samples and complex hierarchical structures.

In embodiments of this patent document, the task of automated semantic indexing is considered as an extreme multi-label learning and classification (XMLC) problem. Different from the traditional multi-class, XMLC allows for the co-existence of millions of labels for each data sample. Recently, several approaches are proposed to deal with XMLC, including FASTXML, LOMTrees, SLEEC, robust Bloom filters, label partitioning, fast label embeddings and several deep learning methods, Hierarchical multi-label classification using local neural networks, DXML and XML-CNN. While those methods have achieved some progress in handling XMLC, the curse of dimensionality (referred to as the huge label space) and the high demand of hand-crafted feature engineering are two major barriers for further improving the effectiveness and efficiency.

In order to address these two issues, embodiments of a novel framework named deep level-wise extreme multi-label learning and classification (Deep Level-wise XMLC) are disclosed in this patent document to deal with the problem of large-scale semantic indexing. In one or more embodiments, the Deep Level-wise XMLC framework comprises two sequential modules. In one or more embodiments, the first module is a level-wise multi-label classification model. It addresses the curse of dimensionality effectively by decomposing massive labels (in a higher dimensional space) into multiple levels (in a lower dimensional space). In one or more embodiments, for each level, a convolutional neural network is constructed with at least two novelties. The first novelty includes a category-based dynamic max-pooling methodology aiming at capturing both label co-occurrences and categorical relations among labels. The dynamic max-pooling methodology helps connect the level-wise classification models tightly. The second novelty includes a prediction refining methodology based on macro F-measure optimization, which enables the module to automatically select the labels in an incremental manner. The second module of the Deep Level-wise XMLC framework is a hierarchical pointer generation model that merges predicted labels for each level into final summarized semantic indexing by the way of copying and generation mechanism. As a whole, the Deep Level-wise XMLC framework avoids high cost of human interferences by learning semantic indexing without any feature engineering. An embodiment of the entire system architecture is shown in FIG. 1, with more details discussed in Section B.

Some of the contributions of this patent document include:

Deep Level-wise XMLC is proposed to learn large scale semantic indexing. It divides labels into multiple levels to lessen the curse of dimensionality while improving the training efficiency.

A new strategy with category-dependent dynamic max-pooling is introduced to capture both co-occurrences and categorical relations among labels.

Embodiments of a prediction refining technique derived from macro F-measure optimization are explored to intelligently select the best labels in an online fashion.

A hierarchical pointer generation model is developed to merge the level-wise outputs into the final summarized semantic indexing.

The effectiveness of Deep Level-wise XMLC embodiments is demonstrated by comparing it with several state-of-the-art methods on automatic labeling of MeSH from MEDLINE, as well as AmazonCat13K which is the XMLC dataset with similar nature as MeSH.

B. Methodology Embodiments

There are two primary challenges in XMLC. Firstly, the number of labels in one dataset may be more than 10,000 or even as large as one million. Secondly, one data sample may be indexed with multiple labels, the number typically ranging from one to several dozens.

In this patent document, embodiments of a Deep Level-wise XMLC framework, as shown in FIG. 1, are disclosed to handle these two challenges by decomposing labels of each data sample into multiple levels. In one or more embodiments, the Deep Level-wise XMLC framework involves five stages: a data preprocessing stage 105, an ontology parsing stage 110, a level-wise model training stage 115, a level-wise prediction stage 120, and a final merging stage 125. In the data preprocessing stage, as usual, tokenization and filtering 138 are made to obtain clean training texts 142 and clean validation texts 144 out of training texts 134 and validation texts 136 respectively. In one or more embodiments, training and validation data are randomly selected according some proportions. Different from usual natural language processing (NLP) tasks, an extra step of ontology parsing using an ontology parser 140 on the training labels 132 is used so that labels will be split into multiple levels 146 based on their ontological hierarchies. In the third stage, the neural model described in the methodology section is employed to train level-wise models 148. In one or more embodiments, the ontology parser 140 serves as the level-wise multi-label classification model (the first of the two sequential modules described in Section A). Then, in the level-wise prediction stage (or testing stage), testing data is fed into the trained level-wise models for label predictions or tagging after the testing data is preprocessed in a similar fashion to obtain level-wise predictions 150. In the last stage, a final merging is made with a pointer generation model 152 to output predicted label(s) 154 and also sift out some less related labels. In one or more embodiments, the pointer generation model 152 serves as the hierarchical pointer generation model (the second of the two sequential modules described in Section A).

Figure 2:
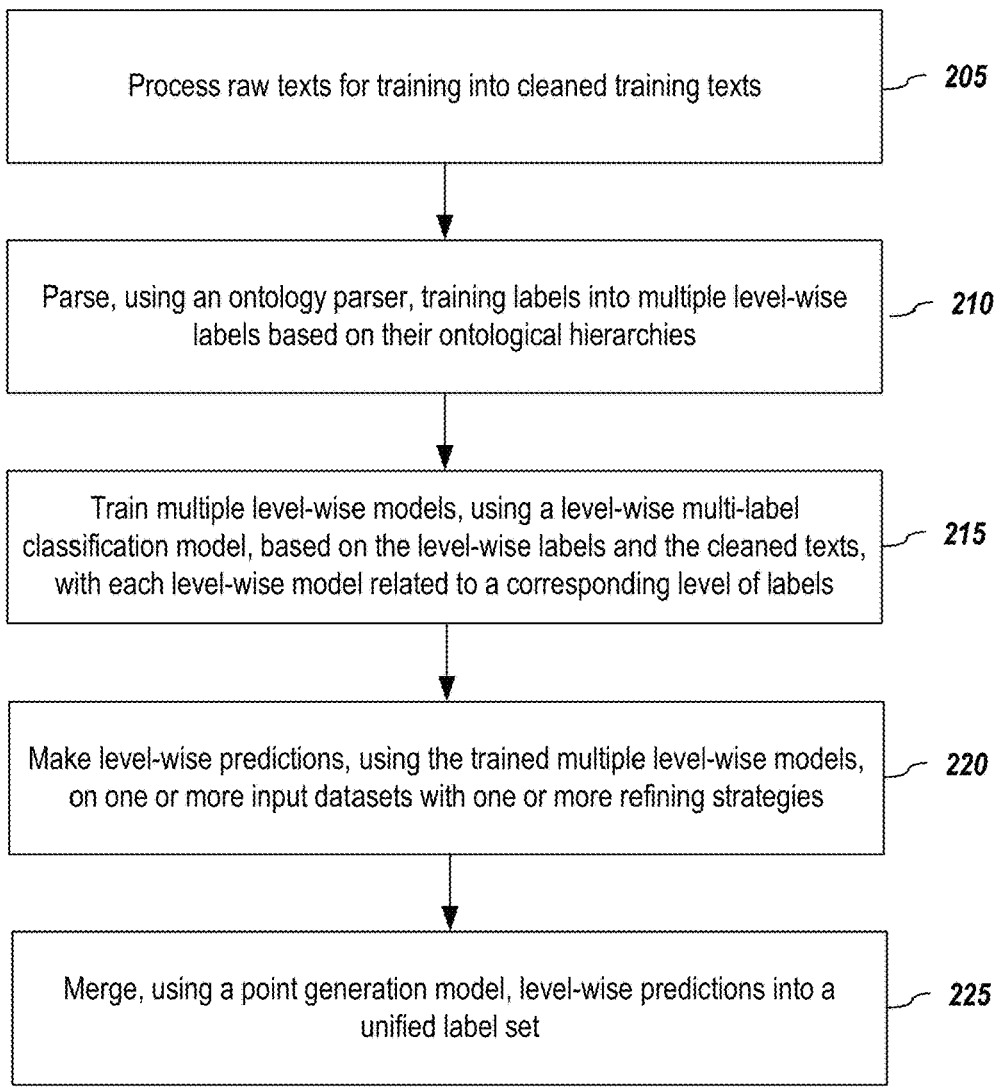
FIG. 2 depicts a labeling process using the Deep Level-wise XMLC, according to embodiments of the present disclosure.

FIG. 2 depicts a labeling process with five steps involved in Deep Level-wise XMLC, according to embodiments of the present disclosure. Firstly, the input raw texts for training and validations are processed (205) with NLP preprocessors into cleaned training texts and cleaned validation texts, respectively. In one or more embodiments, words are tokenized and stop words are filtered out. Secondly, training labels are parsed (210), using an ontology parser, into level-wise labels based on their ontological hierarchies. Thirdly, multiple level-wise models are trained (215) with a level-wise multi-label classification model, based on at least the level-wise labels and the cleaned texts, with each level-wise model related to a corresponding level of labels. Fourthly, level-wise predictions are made (220), using the trained multiple level-wise models, on one or more input datasets with one or more refining strategies. In one or more embodiments, the one or more input datasets may be the cleaned validation texts cleaned with the same NLP preprocessors by tokenizing words, stop words filtering, etc. In one or more embodiments, the one or more input datasets may be text data received on a deployed framework. Finally, a point generation model is trained to merge (225) the level-wise predictions into a unified label set.

The following subsections focus on 1) embodiments of the deep level-wise multi-label learning framework; and 2) embodiments of the pointer generation model to merge labels of all levels into one unified label set.

1. Embodiments of Deep Level-Wise Multi-Label Learning

Formally, the problem may be defined as follows: Given a set of input pairs $\cup U_{i=1}^{N}\{x_i, y_i\}$, Deep Level-wise XMLC decomposes them into M levels and trains M neural models on the training data. The whole label set is denoted as $\mathcal{L}$ and $|\mathcal{L}|$ refers to the total number of labels in $\mathcal{L}$. Each $y_i$ is a multi-hot vector with length $|\mathcal{L}|$. Each model at level m predicts the most probable K labels, $\{\hat{y}_1^m, \ldots \hat{y}_j^m, \ldots \hat{y}_K^m\}$ on each data sample. K is determined with a refining strategy. In the end, a pointer generation model is trained to merge the predicted $\{\hat{y}_i^1, \ldots \hat{y}_i^m, \ldots \hat{y}_i^M\}$ of M levels for each data sample $x_i$ into one unified label set $y_i$.

1.1. Embodiments of Feature Embedding Construction

Figure 3:
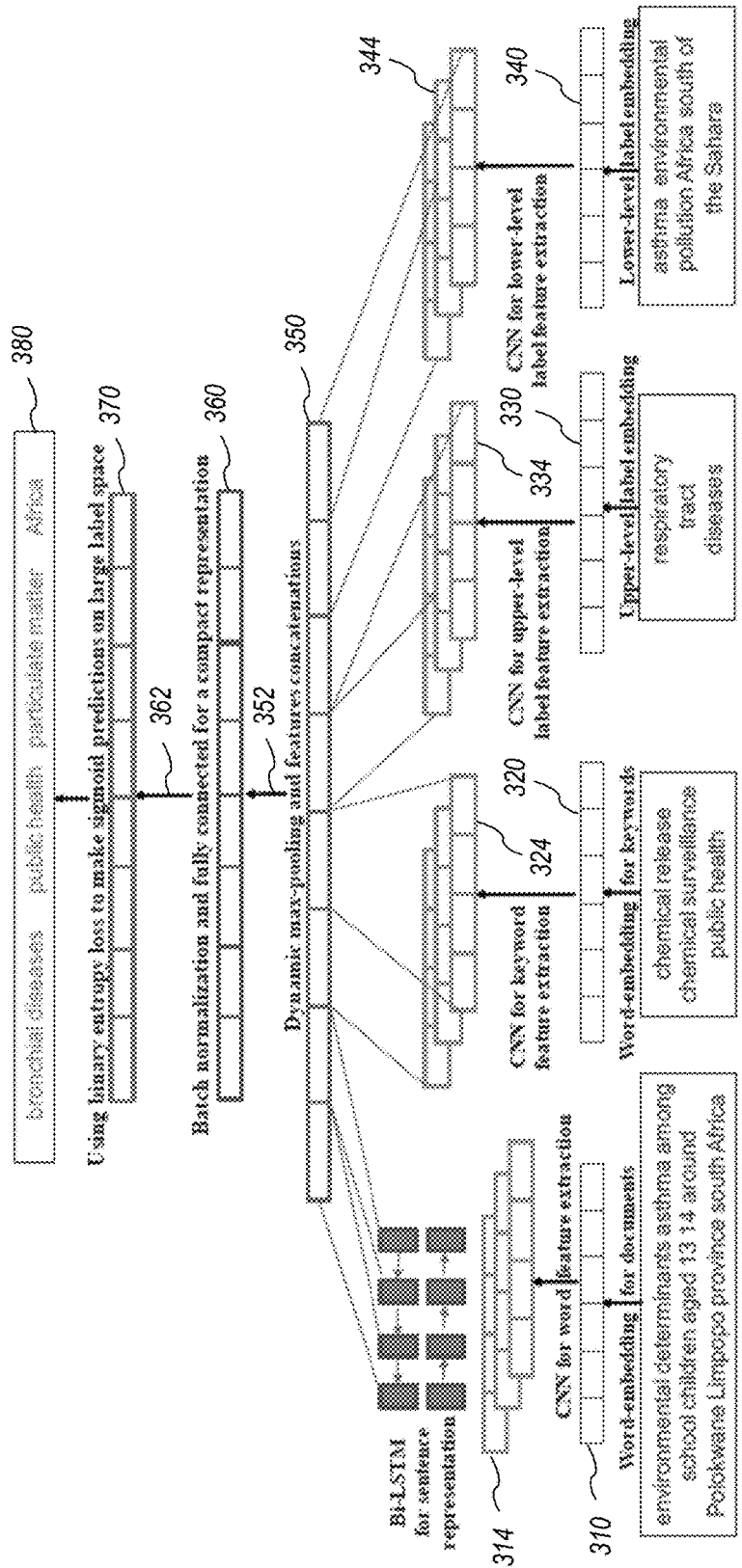
FIG. 3 depicts a neural structure of a deep multi label learning model, according to embodiments of the present disclosure.
Figure 4:
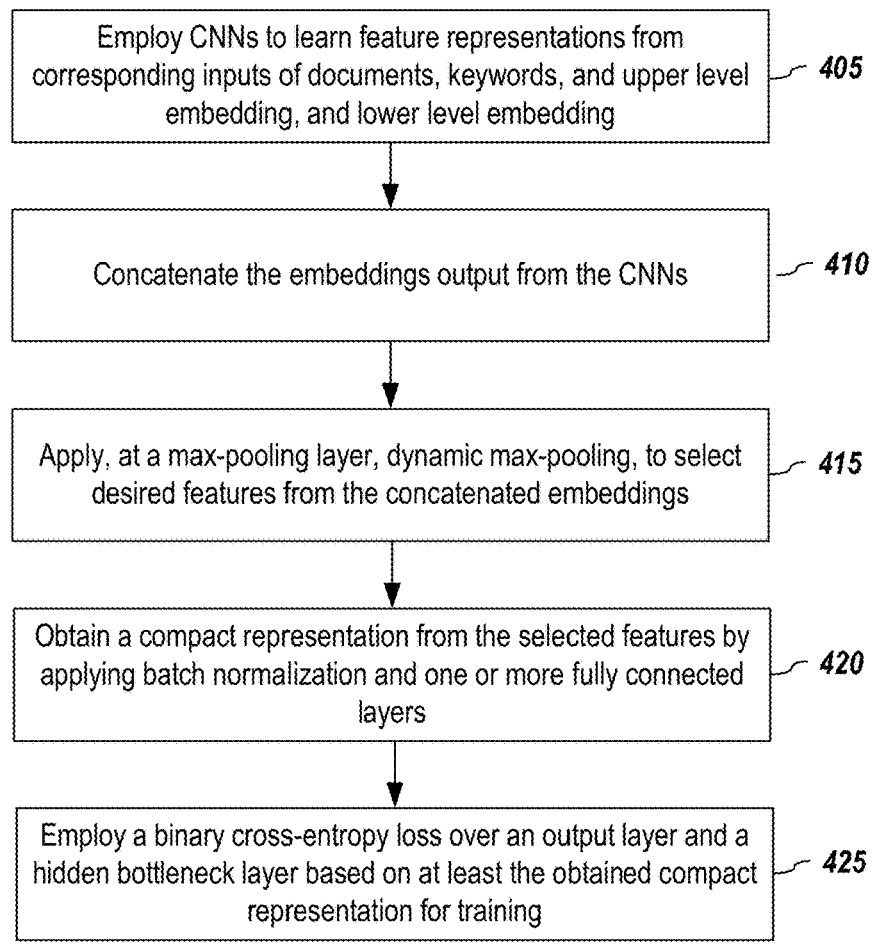
FIG. 4 depicts a process for level-wise prediction with a neural model at each level, according to embodiments of the present disclosure.

In one or more embodiments, models are constructed in a level-wise manner. A neural model 300 is built at each level with four parallel inputs as shown in FIG. 3. FIG. 4 depicts a process for level-wise prediction with the neural model 300 at each level, according to embodiments of the present disclosure.

The four inputs include word embeddings for documents 310, word embeddings for keywords 320 and level-related information (including upper level label embedding 330, and lower level label embedding 340). They provide diverse information for the construction of more discriminative features. In one or more embodiments, a convolutional neural network (CNN) 300 is employed (405) to learn a rich number of feature representations 314, 324, 334, and 344 from corresponding inputs 310, 320, 330, and 340, respectively. In one or more embodiments, document embeddings 314 and keyword embeddings 324 are learned from the CNN directly. The other two embeddings, upper-level embeddings 334 and lower-level label embeddings 344, are learned from the embedding of prediction results from upper and lower levels. In one or more embodiments, two steps are involved. Firstly, similar to word embedding for input texts and keywords, in one or more embodiments, Gensim is employed to train label embeddings from the annotated MeSH. Secondly, in both training and testing, predicted labels for some documents at some levels may be utilized as input features for their upper level or lower level. The two embeddings may not only help capture level-wise dependencies, but also deal with label imbalance issues in XMLC. In this way, both label co-occurrences and the knowledge from their upper and lower levels may help enhance the representation learning of rare labels.

For example, in MeSH, Lymphangioma is a rare label and it may not be easily represented by itself. With the information of its upper level MeSH, Lymphatic Vessel Tumors and lower level MeSH Lymphangioma, Cystic Lymphangioma may be better represented in the embedding space.

After the four embeddings are learned, they are concatenated (410) into concatenated embeddings 352 and delivered into a max-pooling layer 350.

Due to the order information, raw tokens/words may not be directly concatenated to the embeddings of keywords, upper and lower level labels. In one or more embodiments, a bi-directional Long Short-Term Memory (Bi-LSTM) is constructed for raw tokens/words over their CNN features to keep the language order information before concatenation.

1.2. Embodiments of Objective Function of the Learning Framework

In one or more embodiments, after the embedding concatenation, a max-pooling layer 350 is employed to apply (415) dynamic max-pooling to select desired features 352 from the concatenated embeddings. A compact representation 362 is obtained (420) from the selected features 352 by applying batch normalization to one or more normalization layers and one or more fully connected layers 360. Afterwards, a binary cross-entropy loss is employed (425) over an output layer and a hidden bottleneck layer 370 based on at least the obtained compact representation 362 for training purpose. After training using the binary cross-entropy loss, the output layer outputs level-wise labels 380.

In one or more embodiments, the loss function L of the binary cross-entropy objective is formulated as:

$$L = \underset{f}{\mathrm{argmin}} - \frac{1}{N} \sum_{i=1}^{N} \sum_{j=1}^{|\mathcal{L}|} y_{ij} \log(\sigma(f_j(x_i))) + (1 - y_{ij}) \log(1 - \sigma(f_j(x_i))) \quad (1)$$

Where $$\sigma(f_j(x_i)) = \frac{1}{1 + e^{-f_j(x_i)}}$$

and $f_j(x_i)$ denote the output layer function. In addition, $f_j = (x_i) = w_o g_h(w_h[P(c_1), \ldots P(c_i)])$. Here $w_h \in R^{h \times (1 P)}$ and $w_o \in R^{|\mathcal{L}| \times h}$ are weight matrices associated with the hidden bottleneck layer and output layer 370, $g_h$ is the element-wise activation functions, e.g., sigmoid or tan h applied to the bottleneck layer and ıp is the product of ı t and p at the dynamic max-pooling layer. ı refers to the number of features fed into pooling layers and p refers to pooling numbers. Both are determined by the number of features in $x_i$. In addition, $c_i$ is the vector of convolutional features after the pooling operation P(.) from lower layers.

1.3. Embodiments of Categorical-Oriented Dynamic Max-Pooling

In traditional CNN models for text classification, a max-over-time scheme is often adopted, as intuitively the maximum element of a feature map should take the most important information, i.e., P(c)=max {c}, where c refers to output from CNNs. This approach, however, exhibits a severe drawback. Using only one value to represent the whole feature map may miss information when the input document includes multiple topics. For multiple-label learning tasks, multiple pooling can capture richer information. In this patent document, pooling is dynamically performed as $$P(c) = \left[\max\left\{c_{\left(1:\frac{\iota}{p}\right)}\right\}, \ldots, \max\left\{c_{\left(\iota-\frac{\iota}{p}+1:\iota\right)}\right\}\right] \in R^p,$$

where $$c_{\left(1:\frac{\iota}{p}\right)}$$

refers to the sub-vector of c starting from index 1 to $$\frac{\iota}{p},$$

p refers to max-pooling dimension. Previous work used a fixed p. If p is set too large, redundant features may be included. If it is set too small, relevant features may be missing.

In one or more embodiments, level-wise related information, i.e., categorical information of labels, is incorporated into neural structures (e.g. the max-pooling layer) to help select p dynamically. Specifically, p is tuned with the distribution of the label levels. For example, in MeSH, all terms are divided into 16 categories, like Anatomy, Organisms, Diseases and etc. Each category involves diverse subcategories and each label involves different distributions. Based on the distribution, different weights are assigned to determine the p. The larger the weight of the category is, the larger the p is. In one or more embodiments, the weight of the category or the label is initialized from the training data.

1.4. Embodiments of Refining Predictions with Macro F-Measure Maximization

With embeddings and dynamic max-pooling, the network can make level-wise predictions as shown in FIG. 1. At each level, the top-K predicted labels are selected for each data sample. However, a fixed K may yield high recall but low precision. In one or more embodiments of this patent document, the predictions are refined with a more flexible weight adjustment strategy.

In one or more embodiments, online F-measure optimization (OFO) is applied for the weight adjustment. With OFO, a dynamic balance of precision and recall may be achieved. In one or more embodiments, an OFO algorithm optimizes a binary F-measure through threshold tuning in an online fashion.

$$F_{ij}^t = \frac{2\sum_{l=1}^{i} y_{lj}^t \hat{y}_{lj}^t}{\sum_{l=1}^{i} y_{lj}^t + \sum_{l=1}^{i} \hat{y}_{lj}^t} = \frac{2\alpha_{ij}^t}{\beta_{ij}^t} \quad (2)$$

Where $\alpha_{ij}^t = \sum_{l=1}^{i} y_{lj}^t \hat{y}_{lj}^t$ and $\beta_{ij}^t = \sum_{l=1}^{i} y_{lj}^t + \sum_{l=1}^{i} \hat{y}_{lj}^t$. Here $y_{lj}^t$ is the j-th label of the l-th data sample. $F_{ij}^t$ is the accumulated F-score from the first to the i-th data sample on label $y_j$ at iteration t.

Due to the incremental property, the threshold of OFO is updated by two rules. In one or more embodiments, at the same iteration (batch data), the threshold $\lambda_{ij}^t$ is updated according to an inter-iteration rule as $\lambda_{ij}^t = \alpha_{(i-1)j}^t / \beta_{(i-1)j}^t$. At different iterations, it is updated according to a cross iteration rule as $\lambda_{ij}^t = \alpha_{Nj}^{(t-1)} / \beta_{Nj}^{(t-1)}$, where N refers to the number of data samples in one batch. In one or more embodiments, when a new batch starts, i is initialized as 0 and there is no α or β values yet. In one or more embodiments, values from last batch are used initially. Given the i-th data sample, OFO refines predicted labels as $\hat{y}_{ij}^t = [\hat{\eta}(x_{ij}^t)(>\lambda_{ij}^t]$, where $\hat{\eta}(x_{ij}^t)$ refers to the prediction probability of $x_1$ on label $y_j$ at iteration t. In one or more embodiments, the optimal F-measure $\hat{f}(\lambda)$ is twice the value of the optimal threshold $\hat{\lambda}$ as $\hat{F}(\lambda)=2\hat{\lambda}$. Since the presented refining mechanism is dynamic, level-wise and incremental, the optimal threshold $\hat{\lambda}$ will not be fixed until the end of training. In one or more embodiments, it is saved as a parameter for testing.

2. Embodiments of Pointer Generation Model for Final Merging

After having level-wise outputs, those outputs should be merged into one unified label set. However, they cannot simply be combined together because a simple concatenation may lead to a much larger number of labels than the gold standard labels or ground truth labels. In this patent document, a filtering method is disclosed to remove some level-wise labels to make sure that the final distributions of predicted labels are consistent with the gold standard ones. In one or more embodiments, inspired by the text summarization, each level-wise predication is treated as one sentence and the gold standard is treated as a summarized output. The hierarchical relations of labels among levels during decoding, encoding and attention states are taken into consideration.

2.1 Embodiments of Hierarchical Pointer Generation Model

In one or more embodiments, the hierarchical pointer generation model allows both copying labels from the level-wise predictions and generating labels from the whole label set.

Figure 5:
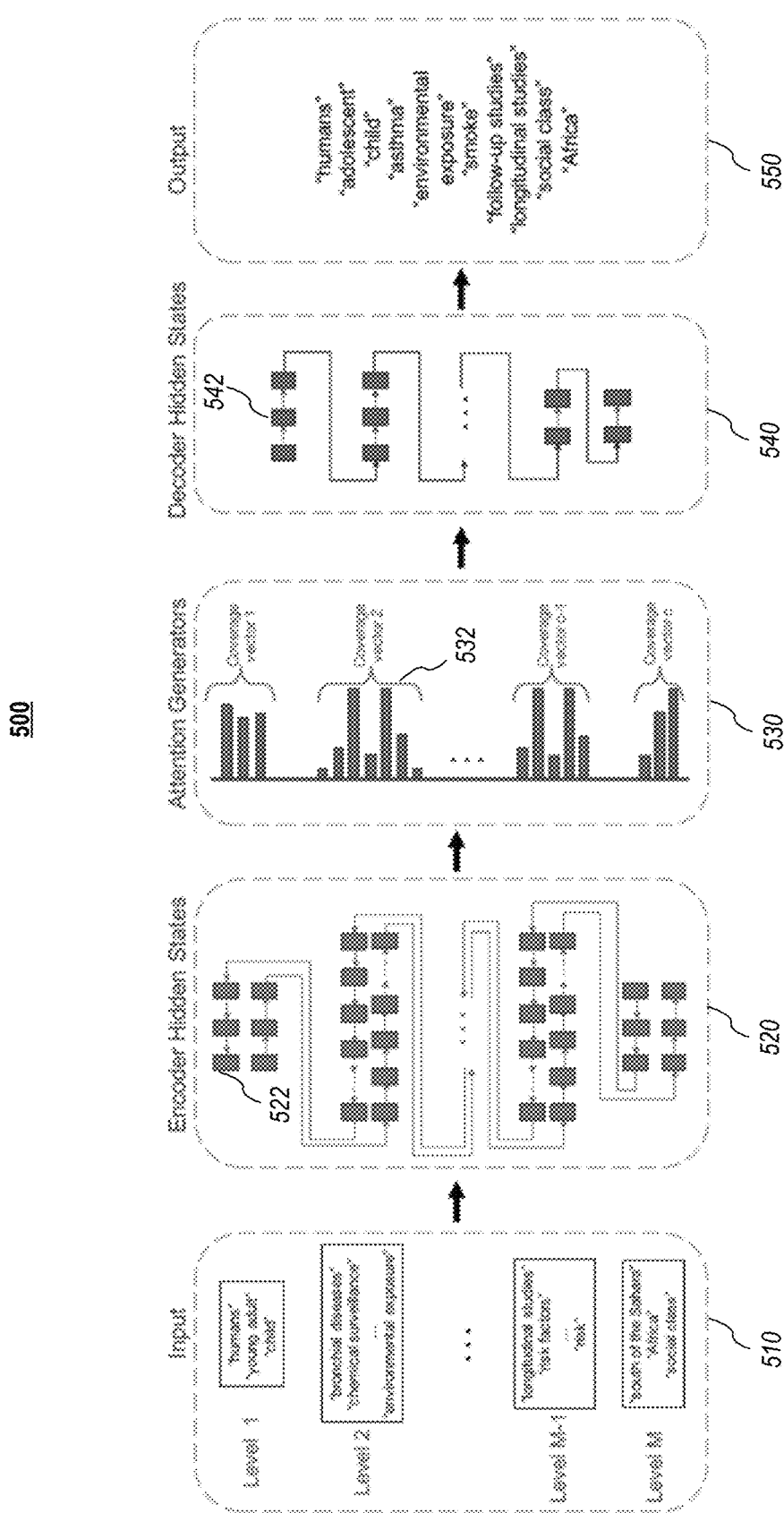
FIG. 5 depicts a pointer generation model for final merging, according to embodiments of the present disclosure.
Figure 6:
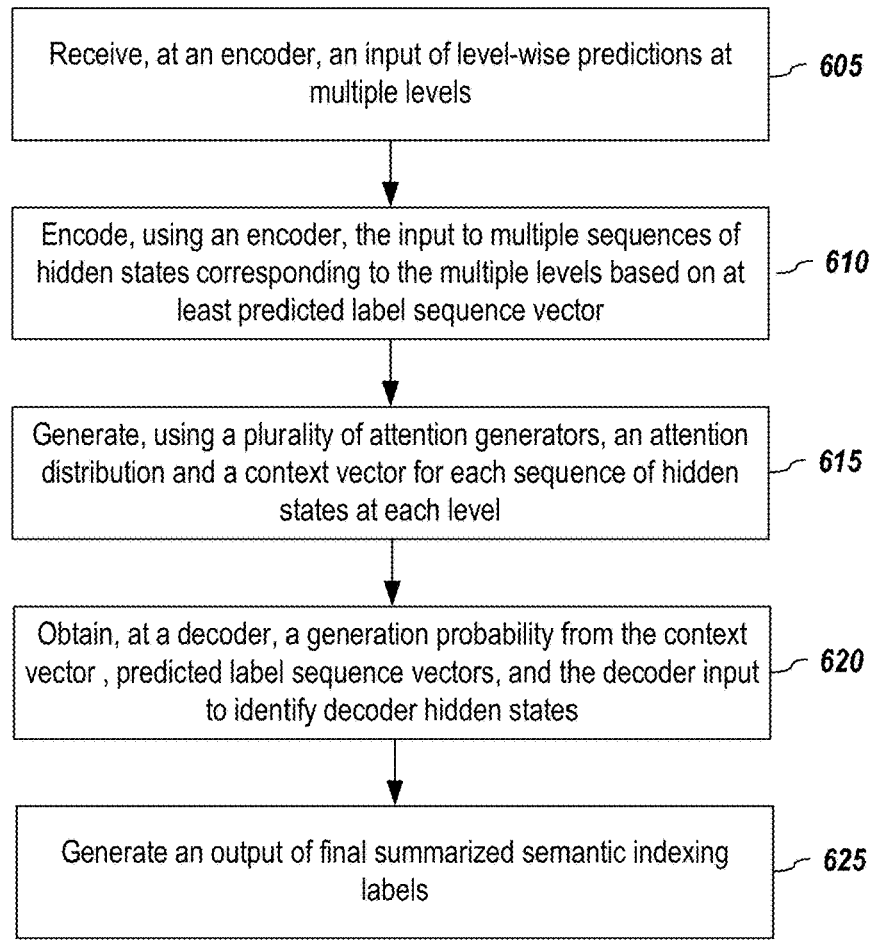
FIG. 6 depicts a process using the pointer generation model for final merging, according to embodiments of the present disclosure.

FIG. 5 depicts a pointer generation model for final merging, according to embodiments of the present disclosure, and FIG. 6 depicts a process using the pointer generation model for final merging, according to embodiments of the present disclosure. The pointer generation model comprises an encoder 520, an attention generator 530 and a decoder 540. The encoder receives (605) an input 510 of level-wise prediction labels, which are organized as sequences level by level from level 1 to level M. The input is encoded (610) to M sequences of hidden states 522. In one or more embodiments, the encoder is a bidirectional LSTM encoder. Each encoded hidden state reflects the inner relations of the predicted labels at a certain level. In one or more embodiments, the encoder hidden state is represented as $e^\tau = v^T \tan h(w_h \gamma^\tau + w_s s^\tau + b_{attn})$. Here $s^\tau$ and $\gamma^\tau$ are the predicted label sequence vector and the context vector surrounding the predicted labels, respectively. The terms $v$, $w_h$, $w_s$ and $b_{attn}$ are weight parameters. In one or more embodiments, the context vector is about the co-occurrences of labels.

In one or more embodiments, a plurality of attention generators 530 are derived from the encoder hidden state to generate (615) an attention distribution $a^\tau$ and a context vector $\gamma^\tau$ at time step $\tau$. In one or more embodiments, $a^\tau$ is calculated as $a^\tau = \text{softmax}(e^\tau)$. The attention distribution is a probability distribution over the predicted level-wise labels. It is used to produce $\gamma^\tau$ as a hierarchical weighted sum of the encoder hidden states: $\gamma^\tau = \sum_q w_q a_q^\tau \gamma_q$, where $\gamma_q$ stands for q-th labels.

In one or more embodiments, each attention generator is named as a coverage vector 532, which shows how much focus is given to labels of each level. As is known, summarizations may lead to repetitions. Hence, the same label may be generated more than once as well. A well-designed coverage vector plays the role of judging whether the label is a duplicate or not. If not a duplicate, the label with a high attention has more chance of being decoded as one right label. If a duplicate, a mechanism to avoid duplications (described in at 2.3 in Section B) filters the label out. Based on coverage vectors described in the methodology, attentions are generated. Then, a decoder is working to generate outputs with reduced sizes In one or more embodiment, to generate decoder hidden states for the decoder, a generation probability $p_{gen} \in [0,1]$ for time step r is obtained (620) from the context vector $\gamma^\tau$, the predicted label sequence vector $s^\tau$ and the decoder input $y^\tau$ (the golden standard or ground-truth) as:

$$p_{gen} = \sigma(w_h \gamma^\tau + w_s s^\tau + w_y y^\tau + b_{ptr}) \quad (3)$$

Where $w_h$, $w_s$, $w_y$ and $b_{ptr}$ are weight parameters. Here $p_{gen}$ is used as a soft switch to choose between generating a label from the whole label set by sampling from the label distribution, $p\mathcal{L}$ (see how $p\mathcal{L}$ is calculated in 2.2, herein) or copying a label from the input sequences by sampling from the attention distribution $a^\tau$.

With the above input level-wise prediction labels, encoder hidden states, attention generators, and decoder hidden states, the hierarchical pointer generation model may be trained to generate (625) an output 550 of final summarized semantic indexing labels. In generating the output, the probability of generating the final labels is learned. Given a training pair $(\cup_{m=1}^{M} y^m, y)$, the conditional probability $p(\cup_{m=1}^{M} y | y, \theta)$ is computed to estimate the labels of the terms of the probability chain rule as:

$$p\left(y \Big| \bigcup_{m=1}^{M} y^m ; \theta\right) = \prod_{\delta=1}^{|\mathcal{L}|} p_\theta(y_\delta | y_1, \ldots, y_{\delta-1}; \theta), \quad (4)$$

where $y = \{y_1, \ldots, y_{|\mathcal{L}_1|}\}$ is a sequence of $|\mathcal{L}|$ vectors. The parameters of the model are learned by maximizing the conditional probabilities for the training set as $$\theta =_\theta \sum_{y, \cup_{m=1}^{M}} \log p\left(y \Big| \bigcup_{m=1}^{M} y^m; \theta\right),$$

where the sum is over training examples.

2.2 Embodiments of Sequence-to-Sequence Probability Calculation

In one or more embodiments, the above procedure finally produces the label vocabulary distribution $p_\mathcal{L}$ as:

$$p\mathcal{L} = \text{softmax}(v'(v[s_t, h^*_t] + b) + b') \quad (5)$$

where v, v', b and b' are learnable parameters. For a specific label, it may be obtained from $p(y_{ij}) = p\mathcal{L}(y_{ij})$. In one or more embodiments, the loss function is the negative log likelihood of the target label $\hat{y}_{ij}$. The following example illustrates the procedure of probability calculations for one label given other labels.

Figure 7:
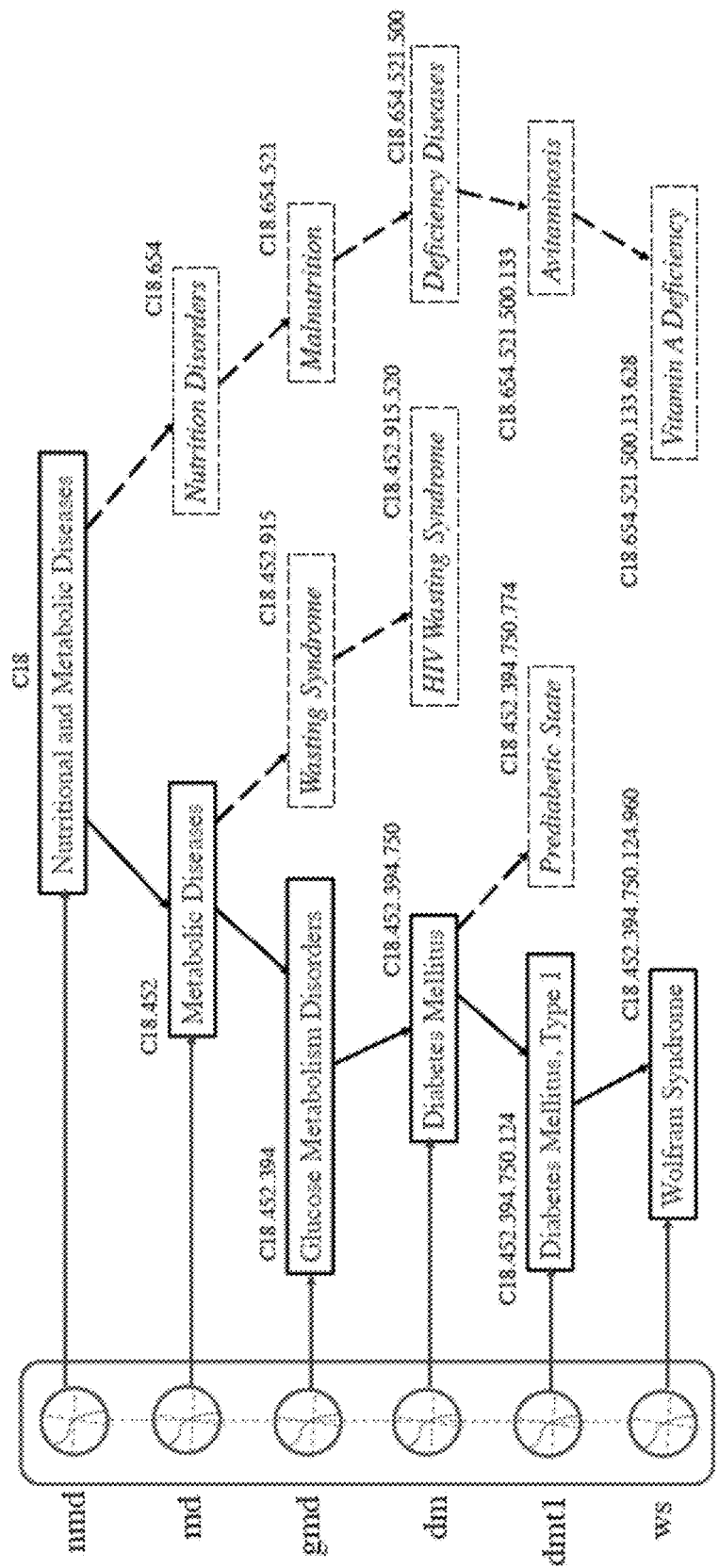
FIG. 7 graphically depicts hierarchical relations for a label set, according to embodiments of the present disclosure.

FIG. 7 depicts hierarchical relations for a label set {Nutritional and Metabolic Diseases} according to one or more embodiments of the present patent disclosure. The left words in the figure are acronyms for the labels. For example, Wolfram Syndrome is shortened with their initial letters as ws. The calculation of the example is described in part 2.2 of Section B. On the left of FIG. 7, for space saving and for better illustration of the process, Sigmoid symbols are drawn there with those short forms, which are the initial letters of the mesh terms.

In one or more embodiments, given context={nmd, md, dm, dmt1}, the hierarchical relations among those labels are followed to calculate $p(e_{ws} | \text{context})$ as:

$$p(e_{ws} | \text{context}) = (1 - \sigma(b_{ptr} + e_{nmd}^T h_{nmd}))\sigma(b_{ptr} + e_{md}^T h_{md}) \\ \sigma(b_{ptr} + e_{dm}^T h_{dm})\sigma(b_{ptr} + e_{edmt1}^T h_{dmt1})) \quad (6)$$

2.3 Embodiments of Mechanism to Avoid Duplications

A problem for a pointer generation model or sequence-to-sequence model is that it may copy terms from input multiple times. Repetitive terms are not needed since each label should be unique. Repetition may be avoided by adopting a coverage mechanism. Namely, if labels have been seen in the output of one level, the probability of generating them at other levels will become low. In one or more embodiments of this patent disclosure, such approaches are taken by combining a coverage mechanism into the whole pointer generation model. Specifically, $$\varkappa^m = \sum_{y^m=0}^{|N|} \varkappa^{y^m}, \quad (7)$$

Where $\varkappa$ refers to a coverage vector, $y^m$ refers to m-th level.

In one or more embodiments of the present patent disclosure, the coverage vectors are composed of a set of vectors for all levels. For each coverage vector, $\varkappa^{y^m}$ is an unnormalized distribution over the level-wise inputs that represents the degree of coverage that those labels have received from the attention mechanism so far. Since labels are ordered with levels, there should be no repetitions at different sections of levels, this mechanism aims at removing all duplicate labels found in different sections and also avoid duplicates within the same level. In one or more embodiments, $w_\varkappa \varkappa^{y^m}$ is added to the attention mechanism and a covloss,m is also added to the total loss function of the pointer generation model as the penalty for any duplications.

C. Some Experiments

It shall be noted that these experiments and results are provided by way of illustration and were performed under specific conditions using a specific embodiment or embodiments; accordingly, neither these experiments nor their results shall be used to limit the scope of the disclosure of the current patent document.

In this section, the effectiveness of embodiments of Deep Level-wise XMLC is evaluated with MEDLINE dataset from the US National Library of Medicine labeled with MeSH and Amazon-Cat13K. As described in Section A, MEDLINE is the largest biomedical literature database in the world and Medical Subject Headings (MeSH) is the domain ontology for tagging articles in MEDLINE. The other dataset, AmazonCat13K, is one of benchmark datasets for developing extreme classification algorithms. It involves 13330 labels, with all labels hierarchically organized, similar to MeSH. The dataset scale, the expert labeling and the hierarchical nature provide a perfect testbed for the presented framework.

1. Data Setting and Preprocessing

The total number of MeSH labels in MEDLINE is 26,000, among which 60% appear more than 1000 times. In one or more experimental settings, those MeSH labels occurring less than 10 times are removed in the experiment. The MEDLINE has 26 million articles with abstracts. 90% of these articles have about 20 MeSH labels. 4 to 16 MeSH labels are assigned to 82% of articles. In MeSH, 3.5 million abstracts have both MeSH labels and keywords. The ontology of MeSH labels can be decomposed into 7 levels, where the lowest level (the 7th level) includes the most specific MeSH labels while the highest level (the 1st level) has the most general and abstract MeSH labels. For articles with only MeSH labels of the lowest level, they are expanded by the following method. Starting from labels at the lowest level, all labels of their upper levels are found out. In one or more experimental settings, 7 datasets are constructed for the proposed Deep Level-wise XMLC framework.

Meanwhile, 102,167 abstracts with MeSH labels from all the 7 levels are put aside for testing. The statistics of the dataset at each level is shown in Table 1. It can be observed that the middle levels have the largest number of labels while the highest level has only 83 labels and the lowest level has 2445 labels. Similar trend can be found for data volumes. Two million articles have labels from level 2, 3 and 4 while less than one million articles have labels from level 1, 6 and 7.

For AmazonCat13K, their preprocessed dataset cannot be directly used since Deep Level-wise XMLC requires text data. Meanwhile, the data should be divided based on their level-wise categories. It is found that all labels may be decomposed into 9 levels. Somewhat differently, if a document from AmazonCat13K has lower labels, it must have higher labels while a document from MeSH is not necessarily so. Therefore, it is straightforward to find a common set for testing for AmazonCat13K (simply use documents with lower categories). In order to keep a reasonable pool of testing data, documents having levels higher than 6 (only 9990, 385, and 31 documents for level 7, 8, and 9, respectively) are ignored.

TABLE 1

The statistics of the datasets. For each level, there are different data volumes. Papers in Medline, do not necessarily imply that they can be tagged higher level MeSH terms even if they are tagged with lower level MeSH terms

| Levels | Data Volumes | | The number of labels | |
|---|---|---|---|---|
| | MeSH | AmazonCat13K | MeSH | AmazonCat13K |
| Level 1 | 969,233 | 858,795 | 83 | 44 |
| Level 2 | 2,444,854 | 812,249 | 1,382 | 362 |
| Level 3 | 2,405,321 | 549,326 | 4,484 | 2,281 |
| Level 4 | 2,182,885 | 427,378 | 6,568 | 6,181 |
| Level 5 | 1,522,195 | 178,042 | 5,750 | 5,372 |
| Level 6 | 906,873 | 71,041 | 3,895 | 1,998 |
| Level 7 | 402,794 | 9,990 | 2,445 | 441 |

In the experiments, for the MEDLINE articles and keywords, at each level, an individual neural network is first trained according to the first component of Deep Level-wise XMLC. The trained model is employed to make predictions on the testing data for each level. Then the predicted level-wise labels as well as the gold standard labels from the training data are utilized by the pointer generation model for the final merging. Likewise, level-wise model is trained for AmazonCat14K except that the latter do not have keywords.

2. Evaluation Metrics

In extreme multi-label classification datasets, even though there are usually huge label spaces, only limited number of relevant labels for each document. This means that it is important to present a short ranked list of relevant labels for each test document. The evaluation thus focuses on the quality of such ranked lists with emphasis on the relevance of the top portion of each list. In one or more experimental settings, however, two evaluation metrics are used for the purpose of comparisons with the two sources of datasets. The medical community prefers to use precision, recall and F-score while those from the general domains prefer precision at K (P@K) and the Normalized Discounted Cumulated Gains (NDCG@K or G@K for short).

Specifically, given a predicted label list $y_1^m = \{y_1, y_2 \ldots, y_K\}$. with top K items at level m, precision, recall and F-score are defined as follows:

$$MiP = \frac{\sum_{i=1}^{N} c(K, i, y_1^K)}{\sum_{i=1}^{N} K_i}, \quad MaP = \frac{1}{N}\sum_{i=1}^{N} \frac{c(K, i, y_1^K)}{K_i}, \quad (8)$$

$$MiR = \frac{\sum_{i=1}^{N} c(K, i, y_1^K)}{\sum_{i=1}^{N} AK_i}, \quad MaR = \frac{1}{N}\sum_{i=1}^{N} \frac{c(K, i, y_1^K)}{AK_i}, \quad (9)$$

$$MiF = \frac{2*MiP*MiR}{MiP + MiR}, \quad MaF = \frac{2*MaP*MaR}{MaP + MaR} \quad (10)$$

where N is the number of data samples and $c(K, i, y_1^K)$ is the number of correct labels among the top K ranked labels; $AK_i$ is the total number of the gold standard labels for article i; The difference between micro measures and macro measures lies in the calculation of the predicted probabilities. For micro measures, the probability calculation is not done until all correct predictions are added together, while for macro measures, the probability calculation will be done for each article and in the end, an average is used as the macro scores. Both measures are reported in order to see how accurate the model is for a single article and for an entire dataset.

In contrast, the definition of P@K and NDCG@K is, $$P@K = \frac{1}{k}\sum_{l \in r_k(\vec{y})} y_l \quad (11)$$

$$DCG@K = \sum_{l \in r_k(\vec{y})} \frac{y_l}{\log(l+1)} \quad (12)$$

$$NDCG@K = \frac{DCG@K}{\sum_{l=1}^{min(k,\|\vec{y}\|)} \frac{y_l}{\log(l+1)}} \quad (13)$$

where $\vec{y} \in \{0,1\}^L$ is denoted as the vector of true labels of a document and $\hat{\vec{y}} \in R^L$ as the system-predicted score vector for the same document. In one or more experimental settings, k=1, 3, 5 are used following the convention of P@K and NDCG@K.

3. Parameter Settings

For the neural network of Deep Level-wise XMLC, the rectified linear units are used. The filtering windows are set to 3, 4, 5. The dropout rate is set to 0.5 and the L2 constraint is set to 3. The mini-batch size is set to 256. The embedding dimensions vary for different features. For Mesh, word embedding for medical words involves 500,000 unique tokens, keyword embedding involves over 100,000 phrases and label embedding 26,000 MeSH terms. Gensim is employed to train the embedding with 300 as the dimension. For AmazonCat13K, pre-trained GoogleNews-vectors-negative300.bin is utilized with 3 million tokens and 300 as the dimension. The values for other hyperparameters are chosen via a grid search on a smaller validation set from the training data.

4. Performance with Online F-Measure Optimization

Figure 8:
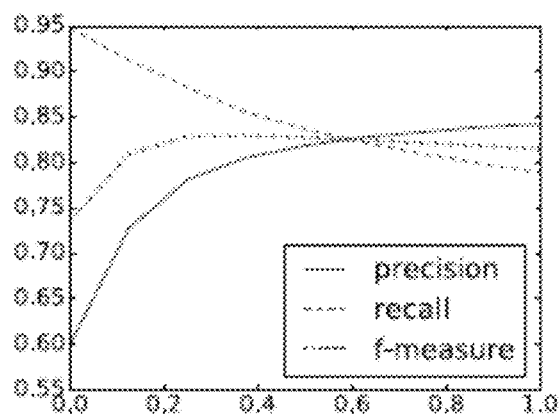
FIG. 8 depicts macro precision, recall and F-score obtained by online macro F-measure optimization (OFO) with Deep Level-wise Extreme Multi-label Learning and Classification (XMLC), according to embodiments of the present disclosure.
Figure 8:
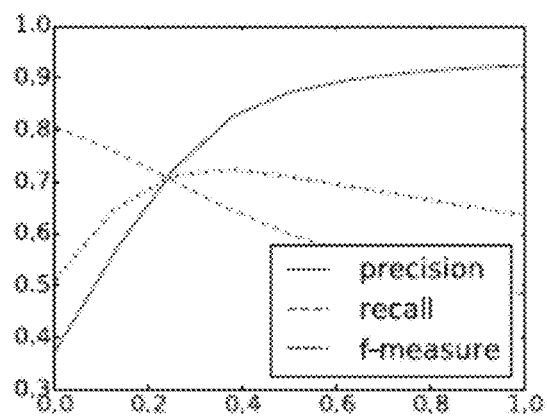
Figure 8:
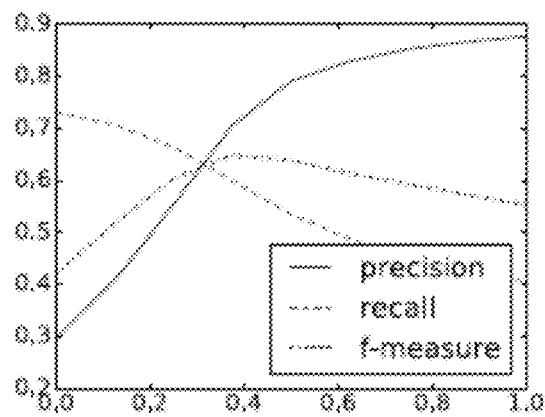
Figure 8:
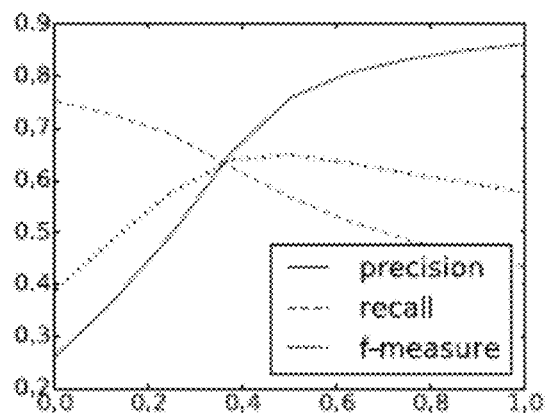
Figure 8:
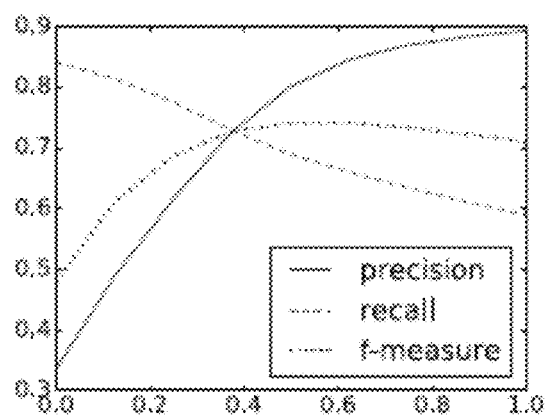
Figure 8:
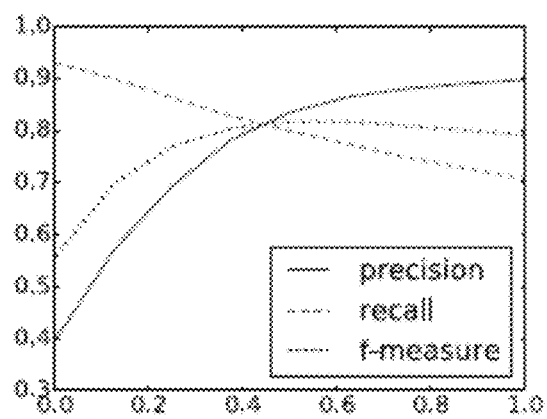

As discussed in Section B.1.4, the online macro F-measure optimization (OFO) is integrated into the proposed framework. In order to show the effectiveness of OFO, the macro precision, recall and F-score are reported for the first 6 levels in FIG. 8 for MeSH. Although the result of the 7th level and that of AmazonCat13K are not shown, similar performances may be obtained for them. It is observed that OFO helps achieve a balance between macro precision and recall. It is further observed that the optimal F-score is different at different levels. If the top K (k=10 in experiment) is always selected for the level-wise prediction, the best F-score cannot be obtained though the recall at each level can be as high as around 80%. The precision can be as low as or less than 20%. The reason is that after MeSH labels of each article are divided into 7 levels, most of articles have only 2 to 5 labels at each level. This means that even if all of labels are within the top 10, the precision is only from 20% to 50% although the recall can be 100%. In this case, the F-scores are not high either. The OFO greatly removes less relevant labels so that the number of labels in the final prediction set of each level ranges from 2 to 5 as well. Meanwhile, most of the correct predictions are still kept in the prediction set. Evidently, this tuning strategy greatly boosts the performance.

5. Level-Wise Performance

As discussed in Section B, the presented Deep Level-wise XMLC framework decomposes the task of XMLC into level-wise model constructions. Therefore, in this section, level-wise prediction results are reported in order to see the intermediate developments and improvements of the whole model.

As is shown in FIG. 3, the level-wise neural models learn label embeddings from the MEDLINE collections, keywords and the predicted labels from the upper or lower levels. Here the performances of the level-wise neural models with different embeddings are reported. The effectiveness of OFO is further demonstrated by comparing with the level-wise neural models by fixing the top K labels for each level. Different K values are tested from 1 to 10 and it is found that the best performance is achieved when K is 5.

Table 2 reports the micro performance for the level-wise model with OFO and top K fixing strategies. Here K is set to 5 for the best results. The performance for the macro measurement is also shown in Table 3. It can be seen that OFO always perform better than the strategy of fixing top K, no matter on the micro or the macro measurements.

Table 2 and Table 3 also report the level-wise prediction with three different embeddings for MeSH. Although the evaluation for AmazonCat13K dataset is not based on F-scores, micro measures for AmazonCat13K are also reported to show the advantages of OFO. After all, the result of P@K and NDCG@K for it is computed on the filtered output with OFO. From this result, an evident incremental trend can be identified for all seven levels. Namely, with keywords and predicted MeSH terms of upper and lower levels added, the prediction sees quick improvements accordingly. It is not hard to see that in general, macro results are better than micro results. Among them, the third level and the fourth level of MeSH while the fourth and the fifth level of AmazonCat13K yield worse results than others while level 1 obtain much better results for both datasets. This is understandable considering the larger number of labels for third and the fourth (4,484 and 6,568 for MeSH while 6,181 and 5,372 for AmazonCat13K respectively).

TABLE 2

The level-wise performance for micro measures with Top K and OFO.
This table aims at showing the incremental improvements on the micro measures when the new features added stepwise for each level. Meanwhile, for each level, results for TopK without optimization and with optimization as OFO are shown there as well.

| Embeddings | Levels | Level 1 | | Level 2 | | Level 3 | | Level 4 | | Level 5 | | Level 6 | | Level 7 | |
|---|---|---|---|---|---|---|---|---|---|---|---|---|---|---|---|
| | Measures | Top K | OFO | Top K | OFO | Top K | OFO | Top K | OFO | Top K | OFO | Top K | OFO | Top K | OFO |
| MEDLINE | MiP | 23.32 | 55.83 | 29.32 | 90.79 | 22.96 | 79.82 | 20.63 | 76.80 | 20.15 | 46.45 | 22.18 | 55.40 | 20.29 | 66.63 |
| Collections | MiR | 95.68 | 84.77 | 65.17 | 37.57 | 38.32 | 35.10 | 37.21 | 37.65 | 49.85 | 62.31 | 72.24 | 73.42 | 83.64 | 82.34 |
| | MiF | 37.50 | 67.32 | 40.44 | 53.15 | 28.72 | 48.75 | 26.54 | 50.53 | 28.70 | 53.22 | 33.93 | 63.15 | 32.66 | 73.66 |
| | | Top K | OFO | Top K | OFO | Top K | OFO | Top K | OFO | Top K | OFO | Top K | OFO | Top K | OFO |
| MEDLINE | MiP | 31.45 | 72.45 | 36.53 | 88.10 | 31.56 | 52.90 | 29.36 | 76.80 | 31.25 | 84.81 | 32.88 | 69.43 | 33.43 | 77.19 |
| Collections & | MiR | 92.56 | 79.56 | 66.72 | 43.03 | 58.53 | 51.09 | 46.31 | 37.65 | 52.75 | 45.11 | 74.43 | 69.18 | 86.48 | 80.63 |
| keywords | MiF | 46.95 | 75.84 | 47.21 | 57.82 | 41.00 | 51.98 | 35.94 | 50.53 | 39.24 | 58.90 | 45.61 | 69.30 | 48.21 | 78.87 |
| MEDLINE | MiP | 39.52 | 81.01 | 43.64 | 69.95 | 40.65 | 68.63 | 38.45 | 63.62 | 40.33 | 73.31 | 41.94 | 76.64 | 45.38 | 84.94 |
| Collections | MiR | 86.75 | 73.93 | 63.27 | 56.05 | 55.33 | 43.70 | 52.31 | 46.76 | 51.14 | 53.07 | 69.45 | 65.88 | 77.36 | 77.30 |
| & keywords & upper & lower labels | MiF | 54.30 | 77.33 | 51.65 | 62.23 | 46.87 | 53.40 | 44.32 | 53.90 | 45.09 | 61.57 | 52.30 | 70.85 | 57.20 | 80.94 |
| AmazonCat13K | MiP | 72.21 | 94.17 | 48.57 | 61.49 | 30.43 | 32.51 | 20.99 | 21.34 | 20.37 | 20.88 | | | | |
| | MiR | 99.56 | 92.24 | 97.42 | 99.55 | 87.47 | 99.86 | 72.03 | 99.92 | 69.24 | 99.91 | | | | |
| | MiF | 83.71 | 93.19 | 64.82 | 76.02 | 45.15 | 49.05 | 32.51 | 35.17 | 31.48 | 34.54 | | | | |

TABLE 3

The level-wise performance for macro measures with Top K and OFO.
This table aims at showing the incremental improvements on the micro measures when the new features added stepwise for each level. Meanwhile, in a similar fashion to Table 2 for each level, results for TopK without optimization and with optimization as OFO are shown there as well.

| Embeddings | Levels | Level 1 | | Level 2 | | Level 3 | | Level 4 | | Level 5 | | Level 6 | | Level 7 | |
|---|---|---|---|---|---|---|---|---|---|---|---|---|---|---|---|
| | Measures | Top K | OFO | Top K | OFO | Top K | OFO | Top K | OFO | Top K | OFO | Top K | OFO | Top K | OFO |
| MEDLINE Collections | MaP | 23.32 | 59.96 | 29.32 | 56.18 | 22.96 | 81.40 | 20.63 | 36.84 | 20.15 | 48.95 | 22.18 | 69.94 | 20.29 | 78.73 |
| | MaR | 96.26 | 94.83 | 65.17 | 76.03 | 47.00 | 43.99 | 44.18 | 72.64 | 56.18 | 81.53 | 75.90 | 48.65 | 85.73 | 65.01 |
| | MaF | 37.55 | 73.47 | 40.44 | 64.61 | 30.85 | 57.11 | 28.13 | 48.89 | 29.66 | 61.12 | 34.32 | 57.38 | 32.81 | 71.22 |
| | | Top K | OFO | Top K | OFO | Top K | OFO | Top K | OFO | Top K | OFO | Top K | OFO | Top K | OFO |
| MEDLINE Collections & keywords | MaP | 33.54 | 92.56 | 37.69 | 85.33 | 33.84 | 82.88 | 32.63 | 80.68 | 34.52 | 61.53 | 33.92 | 69.44 | 36.34 | 76.97 |
| | MaR | 91.35 | 70.23 | 68.27 | 55.80 | 61.33 | 48.79 | 48.94 | 52.16 | 55.77 | 77.55 | 72.94 | 86.25 | 82.88 | 92.67 |
| | MaF | 49.07 | 79.87 | 48.57 | 67.48 | 43.61 | 61.42 | 39.15 | 63.36 | 42.64 | 68.62 | 42.64 | 79.63 | 46.30 | 84.09 |
| MEDLINE Collections & keywords & upper & lower labels | MaP | 42.33 | 80.53 | 45.46 | 82.52 | 41.46 | 70.48 | 38.99 | 75.90 | 43.49 | 84.52 | 43.49 | 86.46 | 49.34 | 92.09 |
| | MaR | 87.77 | 85.53 | 62.37 | 64.59 | 58.34 | 60.06 | 52.35 | 56.80 | 52.35 | 65.96 | 70.44 | 77.32 | 78.63 | 83.58 |
| | MaF | 57.11 | 82.96 | 52.59 | 72.46 | 48.47 | 64.85 | 46.05 | 64.97 | 44.69 | 74.10 | 53.78 | 81.64 | 60.63 | 87.63 |

6. Performance of Final Merging

The proposed Deep level-wise XMLC will merge the level-wise predictions into one unified label set with a pointer generation model. In this section, Deep level-wise XMLC is further compared with five state-of-the-art approaches to demonstrate the effectiveness of the pointer generation model, including MTIDEF (Minlie Huang, et al. Recommending MeSH terms for annotating biomedical articles. Journal of the American Medical Informatics Association 18, 5 (2011), 660-667), MeSH Now (Yuqing Mao and Zhiyong Lu. 2017. MeSH Now: automatic MeSH indexing at PubMed scale via learning to rank. Journal of biomedical semantics 8, 1 (2017), 15), MeSHLabeler, MeSHRanker (Ke Liu, et al., MeSHLabeler: improving the accuracy of large-scale MeSH indexing by integrating diverse evidence. Bioinformatics 31, 12 (2015), i339-i347) and Deep Mesh (Shengwen Peng, et al., DeepMeSH: deep semantic representation for improving large-scale MeSH indexing. Bioinformatics 32, 12 (2016), i70-i79) for MeSH results. All these existing systems make heavy use of feature engineering. In contrast, Deep Level-wise XMLC uses limited external resources. For AmazonCat13K, results of XML-CNN, the state of the art systems are reported on this benchmark dataset.

Starting from MeSH labeling, after obtaining the level-wise results, the hierarchical pointer generation model is trained with predicted results from all levels as the input and the gold standard labels as the output. For model training, the inputs can be organized with each label as an independent unit or with labels of the same level as one unit (known as sentence in the summarization community). Hence, two pointer generation models are trained, with the former known as Deep Level-wise $XMLC_{label}$ and with the latter as Deep Level-wise $XMLC_{level}$. For comparison, results of all levels are added together and less relevant labels are then filtered by their prediction probabilities and by the label distributions in the gold standard (Deep Level-wise $XMLC_{sampling}$).

TABLE 4

Performance of Deep Level-wise XMLC for MeSH dataset.
From the bold numbers, it can be seen that the best performances come from Deep Level-wise XMLC. It is obvious that level-based and dynamic pooling obtain better performance than label-based and dynamic pooling.

| Methods | MaP | MaR | MaF |
|---|---|---|---|
| No Level-wise XMLC | | | |
| MTIDEF | 49.39 | 51.40 | 50.37 |
| BC_D2V-TFIDF | 47.41 | 46.33 | 46.86 |
| MeSHRanker | 53.64 | 54.13 | 53.89 |
| MeSHLabeler | 54.50 | 51.72 | 50.54 |
| DeepMesh | 53.80 | 55.05 | 54.42 |
| MeSH Now | 51.28 | 53.72 | 52.47 |
| Deep Level-wise XMLC without pointer generation network | | | |
| Sampling | 49.56 | 51.21 | 50.37 |
| Max-pooling | 51.56 | 65.52 | 57.70 |
| Deep Level-wise XMLC with pointer generation network | | | |
| Dynamic pooling & label-based | 61.20 | 57.21 | 59.14 |
| Dynamic pooling & level-based | 53.22 | 70.65 | 60.77 |

As shown in Table 4, both Deep Level-wise $XMLC_{label}$ and Deep Level-wise $XMLC_{level}$ outperform other systems much on macro measures in precisions, recalls as well as F-scores. The micro measures, not reported in Table 4, also have similar trends.

By involving embeddings from MEDLINE collections and key-words, Deep Level-wise $XMLC_{label}$ and Deep Level-wise $XMLC_{level}$ achieve much better performances than all other existing cutting edge frameworks. It is observed that different organizations of the inputs may lead to different performances in precision and recall although F scores are quite similar. Deep Level-wise $XMLC_{label}$ achieves better precision while Deep Level-wise $XMLC_{level}$ better recall. This seems to indicate that the presented hierarchical pointer generation model takes into considerations the correlations between labels within the unit. Therefore, Deep Level-wise $XMLC_{level}$, which has longer input unit, obtains better recall. Yet, it also includes more false positives, thus reducing its precision. In contrast, Deep Level-wise $XMLC_{label}$ wins in precision probably it considers more smaller units and then misses more true positives.

Meanwhile, Deep Level-wise XMLC$_{sampling}$ obtains much poorer results than most of existing systems. This shows that the hierarchical pointer generation model may play an important role in reaching the optimal performances in the end. Besides, results of Deep Level-wise XMLC$_{level}$ with max-pooling are also reported. By default, all of the systems work with dynamic max-pooling. Evidently, the result shows that dynamic max-pooling gains advantages over the usual max-pooling strategies.

TABLE 5

Performance of Deep Level-wise XMLC for AmazonCat13K. The version with pointer generation network and dynamic pooling & level-based is used. As stated in 3.1 in Section C, in order to extend the presented methodology from medical field to more general ones, the presented model embodiments are tested on AmazonCat13K as well. For those who use AmazonCat13K, they prefer reporting precision@K and NDCG@K. The performance of XML-CNN for AmazonCat13K is also listed for comparisons.

|  | P@1 | P@3 | P@5 | G@1 | G@3 | G@5 |
|---|---|---|---|---|---|---|
| XML-CNN | 95.06 | 79.86 | 63.91 | 95.06 | 89.48 | 87.06 |
| Deep Level-wise XMLC | 96.52 | 83.72 | 67.89 | 97.48 | 92.32 | 87.52 |

XML-CNN: Jingzhou Liu et al, Deep Learning for Extreme Multi-label Text Classification. In Proceedings of the 40th International ACM SIGIR Conference on Research and Development in Information Retrieval (SIGIR). Tokyo, Japan, 115-124.

For AmazonCat13K, the result is given in Table 5. The state of the art results from XML-CNN are also listed. Table 5 shows higher performance results from the work in the presented patent disclosure. It shall be noted that testing dataset for Deep Level-wise XMLC are extracted from the raw text data with labels of each level, while work of XML-CNN is tested on the standard test dataset prepared by data collectors.

D. Some Related Work

1. Tree-Based Methods

Due to the huge number of labels, the prediction of XMLC may involve high cost in both time and space. Tree-based methods make efforts to reduce both training and testing cost. For example, the label partitioning by sub-linear ranking (LPSR) method attempts to reduce the prediction time by learning a hierarchy over a base classifier. Some propose a method as the multi-label random forest (MLRF), which seeks to learn an ensemble of randomized trees instead of relying on the learning of a base classifier. FastXML is proposed to learn a hierarchy not over the label space but over the feature space. It defines the set of labels active in a region to be the union of the labels of all training points present in that region. At each node of the hierarchy, an NDCG-based objective is optimized. Namely, at each node, a hyperplane is induced and it splits the set of documents in the current node into two subsets. Predictions are made by returning the ranked list of the most frequently occurring labels in all the leaf nodes. Recently, some developed multi-label classifications for social streams based on ensemble random forests. They integrate a base learner and a label-based learner to learn hierarchical labels. However, these approaches suffer from high cost of training due to the dimensionality of both label space and feature space.

2. Embedding Methods

Embedding methods attempt to overcome the intractability issue brought by the huge number of labels by projecting label vectors onto a low dimensional space and thus reducing the number of labels. The assumption is that the label matrix is low-rank. Due to its strong theoretical foundations and the ability to handle label correlations, embedding methods have proved to be the most popular approach for tackling XMLC problems. In particular, a recently proposed embedding method sparse local embeddings for extreme multi-label classification (SLEEC) greatly increases the accuracy after the non-linear neighborhood constraints are incorporated in the low-dimensional embedding space for training and a simple k-nearest neighbor (k-NN) clustering is used in the embedding space for testing. In one or more embodiments of the present patent disclosure, further steps are taken by exploring level-wise label embedding to improve the predictions of neural structure.

3. Embedding Methods

Max-margin method is also employed to handle multi-label classification. Some propose a model named as PD-Sparse. Essentially, a linear classifier is learned for each label with L1 and L2 norm penalty on the weight matrix associated with this label. This results in a sparse solution in both the primal and dual spaces. A fully-Corrective Block-Coordinate Frank-Wolfe training algorithm is used to achieve sub-linear training time with respect to the number of primal and dual variables while getting better performance than 1-vs-all SVM and logistic regression on multi-label classification, with significantly reduced training time and model size. However, same as 1-vs-all SVM, the PD-Sparse method is algorithmically not scalable to extreme multi-label learning.

4. Deep Learning-Based Method

Deep learning-based method has also been used for multi-label learning. Some incorporate label space embedding into feature embedding. Specifically, an adjacency matrix is constructed for labels A and the label graph matrix is derived with the equation $M=(A+A^2)/2$. Then, for each nonzero entry in the matrix, a tuple composed of the index p, q and $M_{pq}$ is fed to a label embedding network to train a compound network together with the word-embedding. In the prediction stage, k-NN search is performed in the low-dimensional feature representation to find similar samples from training datasets. The average of the k-NN's labels is set as final label prediction. Some propose to take multi-label co-occurrence patterns into the neural network objective to improve the classification performance. They also propose to employ dynamic max-pooling to capture rich information from different regions of the document and an additional hidden bottleneck layer to reduce model size. Moreover, a binary cross-entropy loss over sigmoid output is tailored to XMLC. However, these methods are not applicable for data with complex hierarchical labels since the decomposition of label hierarchies reduce the label space greatly. In addition, some propose Boltzmann CNNs-based hybrid learning network to handle biomedical literature classification. Their work is enriched with data sequence embeddings. This design is not good for huge label space. Their experiments only focus on classes fewer than 2,000 MeSH labels. Some propose a hierarchical multi-label classification network (HMCN), which is claimed to be capable of simultaneously optimizing local and global loss functions for discovering local hierarchical class-relationships and global information from the entire class hierarchy while penalizing hierarchical violations. But their work has higher computational complexity due to the utilization of fully feed-forward layers. Even if HMCN network is simplified with LSTM-like model with shared weights, it still has high computation burden. It seems that is why datasets of at most about 4000 labels was reported for HMCN.

E. Some Conclusions

Disclosed herein are embodiments of a deep learning-based level-wise framework to handle extreme multi-label learning and classification, named generally (for convenience and not limitation) as Deep Level-wise XMLC. Embodiments of Deep Level-wise XMLC includes several innovations. Firstly, in one or more embodiments, a split model training mechanism divides labels into multiple levels so that the curse of dimensionality and training cost are both lessened to a large degree. Secondly, in one or more embodiments, category-dependent dynamic max-pooling and weights adjustments with macro F-measure are integrated into the neural architecture so that the final predictions fit more to the distributions of the levels and their hierarchical relations. Thirdly, in one or more embodiments, a hierarchical pointer generation model successfully merges level-wise outputs into one unified label prediction.

The results show that embodiments of Deep Level-wise XMLC achieve state-of-the-art results by utilizing MEDLINE collections, keywords and predicted labels from upper and lower levels. The results for AmazonCat13K also show that embodiments of Deep Level-wise XMLC is generic enough to handle diverse datasets.

In this patent disclosure, it is not hard to see that Deep Level-wise XMLC embodiments can be conveniently transferred to tasks, like large scale semantic indexing for constructing more efficient and accurate information retrieval engines and reducing expensive manual expert efforts as shown in this work.

One skilled in the art shall recognize that additional embodiments may include different, more robust loss functions, as well as adding more layers for handling feature refinements or weight adjustments and meanwhile improving running efficiency.

F. System Embodiments

In embodiments, aspects of the present patent document may be directed to, may include, or may be implemented on one or more information handling systems/computing systems. A computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, phablet, personal digital assistant (PDA), smart phone, smart watch, smart package, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, ROM, and/or other types of memory. Additional components of the computing system may include one or more disk drives, one or more network ports for communicating with external devices as well as various input and output (I/O) devices, such as a keyboard, a mouse, touchscreen and/or a video display. The computing system may also include one or more buses operable to transmit communications between the various hardware components.

Figure 9:
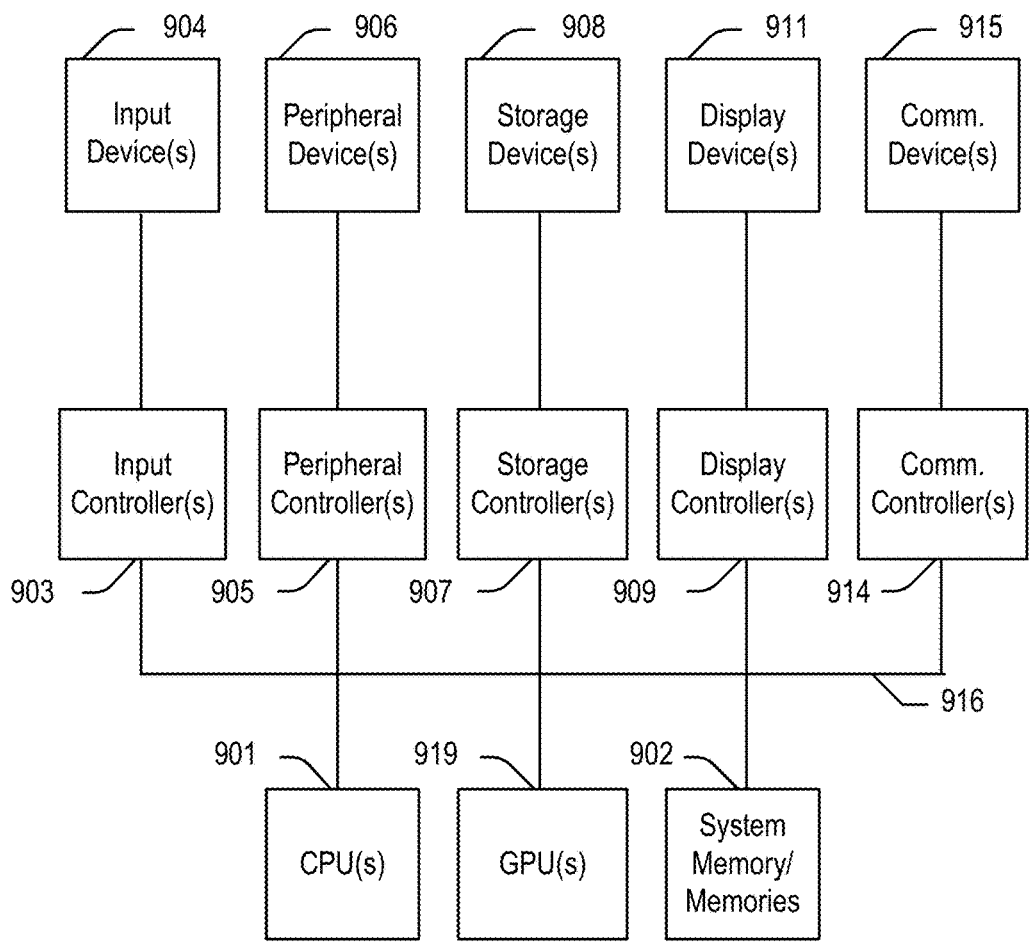
FIG. 9 depicts a simplified block diagram of a computing device/information handling system, in accordance with embodiments of the present disclosure.

FIG. 9 depicts a simplified block diagram of a computing device/information handling system (or computing system) according to embodiments of the present disclosure. It will be understood that the functionalities shown for system 900 may operate to support various embodiments of a computing system—although it shall be understood that a computing system may be differently configured and include different components, including having fewer or more components as depicted in FIG. 9.

As illustrated in FIG. 9, the computing system 900 includes one or more central processing units (CPU) 901 that provides computing resources and controls the computer. CPU 901 may be implemented with a microprocessor or the like, and may also include one or more graphics processing units (GPU) 919 and/or a floating-point coprocessor for mathematical computations. System 900 may also include a system memory 902, which may be in the form of random-access memory (RAM), read-only memory (ROM), or both.

A number of controllers and peripheral devices may also be provided, as shown in FIG. 9. An input controller 903 represents an interface to various input device(s) 904, such as a keyboard, mouse, touchscreen, and/or stylus. The computing system 900 may also include a storage controller 907 for interfacing with one or more storage devices 908 each of which includes a storage medium such as magnetic tape or disk, or an optical medium that might be used to record programs of instructions for operating systems, utilities, and applications, which may include embodiments of programs that implement various aspects of the present invention. Storage device(s) 908 may also be used to store processed data or data to be processed in accordance with the invention. The system 900 may also include a display controller 909 for providing an interface to a display device 911, which may be a cathode ray tube (CRT), a thin film transistor (TFT) display, organic light-emitting diode, electroluminescent panel, plasma panel, or other type of display. The computing system 900 may also include one or more peripheral controllers or interfaces 905 for one or more peripherals 906. Examples of peripherals may include one or more printers, scanners, input devices, output devices, sensors, and the like. A communications controller 914 may interface with one or more communication devices 915, which enables the system 900 to connect to remote devices through any of a variety of networks including the Internet, a cloud resource (e.g., an Ethernet cloud, an Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals.

In the illustrated system, all major system components may connect to a bus 916, which may represent more than one physical bus. However, various system components may or may not be in physical proximity to one another. For example, input data and/or output data may be remotely transmitted from one physical location to another. In addition, programs that implement various aspects of the invention may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

Aspects of the present invention may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present invention may further relate to computer products with a non-transitory, tangible computer-readable medium that have computer code thereon for performing various computer-implemented operations. The media and computer code may be those specially designed and constructed for the purposes of the present invention, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present invention may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present invention. One skilled in the art will also recognize that a number of the elements described above may be physically and/or functionally separated into sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A computer-implemented method for multi-label learning and classification using one or more processors to cause steps to be performed comprising:
   processing raw training texts into cleaned training texts;
   parsing training labels into level-wise labels at multiple levels based on their ontological hierarchies;
   training a set of two or more level-wise models of a level-wise multi-label classification model based on at least the level-wise labels and the cleaned texts, with each level-wise model related to a corresponding level of labels;
   obtaining, using the trained set of two or more level-wise models, level-wise predictions from one or more inputs; and
   using the level-wise predictions as inputs into a point generation model to train the point generation model to generate a reduced set of the level-wise predictions comprising a set of relevant labels.

2. The computer-implemented method of claim 1 wherein the one or more inputs comprise word embeddings for documents, word embeddings for keywords, upper-level embedding, and lower-level embedding.

3. The computer-implemented method of claim 2 wherein obtaining level-wise predictions comprises:
   receiving, at convolutional neural networks (CNNs) within each level-wise model, inputs of word embeddings for documents, word embeddings for keywords, upper-level label embedding, and lower-level label embedding, for feature representations extraction from each input;
   obtaining concatenated embeddings using the extracted feature representations from each input;
   performing, at a max-pooling layer, a dynamic max-pooling to select desired features from the concatenated embeddings;
   obtaining a compact representation from the desired features by applying batch normalization and one or more fully connected layers; and
   employing a binary cross-entropy loss over an output layer and a hidden bottleneck layer based on at least the obtained compact representation to train each level-wise model.

4. The computer-implemented method of claim 3 wherein a bi-directional Long Short- Term Memory (Bi-LSTM) is constructed over the feature representations extracted from the word embeddings for documents to keep language order before concatenation.

5. The computer-implemented method of claim 3 wherein in performing dynamic max-pooling, level-wise related information of labels is incorporated into neural structures of at least the max-pooling layer to capture both label co-occurrences and categorical relations among labels for dynamically selection of max-pooling dimension.

6. The computer-implemented method of claim 1 wherein the step of obtaining, using the trained set of level-wise models, level-wise predictions from one or more inputs further comprises using one or more refining strategies, in which the one or more refining strategies comprises a macro F-measure optimization to enable each level-wise model to refine level-wise predictions in an incremental manner through threshold tuning.

7. The computer-implemented method of claim 1 wherein using the level-wise predictions as inputs into a point generation model to train the point generation model to generate a reduced set of the level-wise predictions comprising a set of relevant labels comprises:
   encoding, using an encoder within the point generation model, the level-wise predictions to multiple sequences of encoder hidden states corresponding to the multiple levels respectively;
   deriving a plurality of attention generators from the multiple sequences encoder hidden state to generate an attention distribution and a context representation for each of the multiple levels;

obtaining a generation probability from the context representation, predicted label sequence representations, and decoder input to generate multiple sequences of decoder hidden states; and generating an output of final summarized semantic indexing labels based on at least the decoder hidden states.

8. The computer-implemented method of claim 7 wherein a coverage mechanism is combined with the point generation model to remove repetitive terms in each level and across levels.

9. A system of multi-label learning and classification for large scale semantic indexing, the system comprising:

a level-wise multi-label classification model decomposing labels in a high dimensional space into level-wise labels in multiple levels based on ontological hierarchies of the labels, the level-wise multi-label classification model comprises multiple neural network (NN) models, with a NN model for each level, each NN model extracts feature representations from inputs of word embeddings for documents, word embeddings for keywords, an upper-level label embedding, and a lower-level label embedding, each NN model comprises:

a max-pooling layer for dynamic max-pooling to select features from concatenated embeddings concatenated from feature representations extracted from inputs;

one or more normalization layers and one or more fully connected layers for batch normalization and obtaining a compact representation from the selected features; and an output layer outputting level-wise predictions for the level; and a point generation model that receives the level-wise predictions for each of the multiple levels as inputs and generates a unified label set for the documents, the point generation model comprises:

an encoder to encode the level-wise predictions to multiple sequences of encoder hidden states corresponding to the multiple levels;

a plurality of attention generators derived from the multiple sequences encoder hidden state to generate an attention distribution and a context representation for each of the multiple levels; and a decoder to generate multiple sequences of decoder hidden states based on at least the generated context representation for each of the multiple levels, the decoder generates the unified label set using at least the decoder hidden states.

10. The system of claim 9 wherein a bi-directional Long Short-Term Memory (Bi-LSTM) is constructed over the feature representations extracted from the word embeddings for documents to keep language order before concatenation.

11. The system of claim 9 wherein in performing dynamic max-pooling, level-wise related information of labels is incorporated into neural structures of the max-pooling layer to dynamically select max-pooling dimension.

12. The system of claim 9 wherein the level-wise multi-label classification model uses an online F-measure optimization (OFO) to enable each NN model to refine level-wise predictions in an incremental manner through tuning a threshold for the OFO.

13. The system of claim 12 wherein the threshold is updated according to an inter-iteration rule within a same iteration and a cross-iteration rule between iterations.

14. The system of claim 9 wherein the point generation model incorporates a coverage mechanism to remove repetitive labs in each level and across levels.

15. The system of claim 9 wherein each NN model further comprises a bottleneck layer with an activation function, the NN model is pre-trained by employing a binary cross-entropy loss over the output layer and the bottleneck layer.

16. The system of claim 15 wherein the binary cross-entropy loss is function involving weight matrices associated with the bottleneck layer and output layer.

17. A computer-implemented method for multi-label learning and classification for one or more documents using one or more processors to cause steps to be performed comprising:

applying a first module comprising a set of two or more level-wise neural network (NN) models, in which each level-wise NN model has an associated level and performs steps comprising:

extracting feature representations from inputs of word embeddings, word embeddings for keywords, an upper hierarchical level label embedding, and a lower hierarchical level label embedding;

concatenating the feature representations extracted from all inputs into concatenated embeddings;

applying dynamic max-pooling, at a max-pooling layer, to select features from concatenated embeddings;

applying batch normalization and one or more fully connected layers to obtain a compact representation from the selected features; and outputting, from an output layer of the level-wise NN model, level-wise predictions corresponding to the associated level of the level-wise NN model; and obtaining, using a point generation model, and the level-wise predictions from the set of two or more level-wise NN models, a unified label set.

18. The computer-implemented method of claim 17 wherein obtaining the unified label set comprises:

encoding, using an encoder, the level-wise predictions to multiple sequences of encoder hidden states corresponding to multiple levels respectively;

deriving a plurality of attention generators from the multiple sequences encoder hidden state to generate an attention distribution and a context representation for each of the multiple levels;

generating, using a decoder, multiple sequences of decoder hidden states based on at least the generated context representation for each of the multiple levels; and generating, from the decoder, the unified label set using at least the decoder hidden states.

19. The computer-implemented method of claim 18 wherein in performing dynamic max-pooling, both label co-occurrences and categorical relations among labels are captured to dynamically select max-pooling dimension.

20. The computer-implemented method of claim 18 wherein the first module uses an online F-measure optimization (OFO) to enable refinement of level-wise predictions in an incremental manner through tuning a threshold for the OFO, the threshold is updated according to an inter-iteration rule within a same iteration and a cross-iteration rule between iterations.

* * * * *